US006394814B2

(12) United States Patent
Schmid et al.

(10) Patent No.: US 6,394,814 B2

(45) Date of Patent: May 28, 2002

(54) ELECTRICAL PLUG-IN CONNECTOR FOR PROVIDING AN ELECTRICAL CONNECTION BETWEEN TWO REGIONS SEPARATED BY A PARTITION WALL

(75) Inventors: Wolfgang Schmid, Langenargen; Gerhard Birkenmaier, Meckenbeuren; Rudolf Fekonja, Munich; Peter Epe, Lennestadt; Klaus Buhle, Schwerte; Hans-Joachim Martin, Kressborn, all of (DE)

(73) Assignees: ZF Friedrichshafen AG; Bayerische Motoren Werke AG; Leopold Kostal GmbH & Co. KG, all of (DE)

( * ) Notice: Subject to any disclaimer, the term of this patent is extended or adjusted under 35 U.S.C. 154(b) by 0 days.

(21) Appl. No.: 09/848,001

(22) Filed: May 3, 2001

Related U.S. Application Data

(63) Continuation of application No. 09/646,721, filed as application No. PCT/EP99/04424 on Jun. 25, 1999, now abandoned.

(30) Foreign Application Priority Data

Jul. 9, 1998 (DE) ........................................ 198 30 672

(51) Int. Cl.[7] ................................................ H02B 1/01

(52) U.S. Cl. .................................................. 439/55 D

(58) Field of Search ................................ 439/550, 551, 439/544, 565, 563, 582, 578, 859, 854

(56) References Cited

U.S. PATENT DOCUMENTS

| | | | | | |
|---|---|---|---|---|---|
| 2,677,811 | A | * | 5/1954 | Anderson et al. | 439/349 |
| 2,869,094 | A | | 1/1959 | Francis | |
| 2,938,188 | A | | 5/1960 | Lazzery | |
| 4,179,179 | A | * | 12/1979 | Lowden | 439/364 |
| 4,451,103 | A | | 5/1984 | Buresh et al. | |
| 5,066,247 | A | | 11/1991 | Watson | |
| 5,607,324 | A | * | 3/1997 | Saur et al. | 439/565 |
| 5,632,648 | A | | 5/1997 | Liu | |
| 5,769,661 | A | | 6/1998 | Nealis | |
| 5,772,470 | A | * | 6/1998 | Togashi | 439/582 |
| 5,941,730 | A | | 8/1999 | Uchiyama et al. | |

FOREIGN PATENT DOCUMENTS

| | | |
|---|---|---|
| DE | 87 00 209.4 01 | 4/1987 |
| DE | 40 19 570 A1 | 2/1992 |
| DE | 297 21 908 U1 | 3/1998 |

* cited by examiner

*Primary Examiner*—Brian Sircus
*Assistant Examiner*—Jean Duverne
(74) *Attorney, Agent, or Firm*—Brooks & Kushman, P.C.

(57) ABSTRACT

An electrical plug-in connector for electrically connecting two regions separated by a wall. The wall has an assembly hole with a reinforcement bead on a first wall side around the hole. The connector includes a connector part positioned on a second wall side. A guide bushing is positioned on the first wall side. An extended portion of the bushing penetrates the hole in the wall. The extended portion has a support flange and a lock stop. The support flange is supported on the bead on the first wall side. The lock stop extends through the hole to the second wall side and is connected to the connector part. A locking element is connected to the connector part and is operable to engage the lock stop and exert a fastening pressure directed away from the wall towards the connector part such that the extended portion braces the bushing against the hole.

13 Claims, 3 Drawing Sheets

ELECTRICAL PLUG-IN CONNECTOR FOR PROVIDING AN ELECTRICAL CONNECTION BETWEEN TWO REGIONS SEPARATED BY A PARTITION WALL

CROSS-REFERENCE TO RELATED APPLICATIONS

This application is a continuation of U.S. application Ser. No. 09/646,721 filed Sep. 21, 2000 now abondoned which, in turn, is based on PCT application Ser. No. PCT/EP99/04424, filed Jun. 25, 1999.

BACKGROUND OF THE INVENTION

1. Field of the Invention

The present invention relates to the area of electrical plug-in connectors to achieve an electrical connection between two electrical regions separated from one another by a partition wall. The invention relates in particular to an electrical plug-in connector comprising a connector part with electrical plug-in contacts, a guide bushing connected to said connector part designed to penetrate an assembly hole made in a wall, and an electrical socket part containing electrical contact jacks that is insertable into the oppositely facing opening of said guide bushing to create an electrical connection with said plug-in contacts, said plug-in connector being firmly held against the wall after installation.

2. Background Art

Such electrical plug-in connectors are required, for example, for the use of gear control systems in motor vehicles. In such cases, the gear wall is the partition wall between an electrical plate, located inside the gear housing, upon which is fitted a connector part with electrical plug-in contacts and a pin housing in order to establish electrical contact with said electrical plate. To achieve contact of said electrical plug-in contacts of said connector part, a socket part is provided which is attachable to said electrical plug-in contacts in order to provide the desired electrical plug-in connector with contact jacks contained in said socket part. Said socket part is arranged at one end of a cable section whose other end is connected to the inputs and outputs of an electronic control system that monitors and controls the electronic systems within said gear housing.

Such a plug-in connector is known from German Utility Model 297 21 908.1. For the electrical plug-in connector represented in said document, the connector part as described above is part of the electrical plate from which the electrical plug-in contacts project in the direction of the gear wall. The plug-in contact arrangement is bordered by a bridge-like insert edge. Said insert edge forms a receptacle for the front section of the socket part and for receiving a guide bushing. Said guide bushing is arranged to project upward through said gear wall from said electrical plate and to border the inside of the insert edge. Said guide bushing is connected to said insert edge by a fastening clamp. With a section having locking grooves on the outer side, said guide bushing projects from said gear wall on the opposite side of said electrical plate. Said locking grooves serve to lock a bayonet ring fitted to said socket part to secure the electrical plug-in connection created.

The bayonet ring, on its end at the plug-in side, has a support flange that is supported on the outer surface of the gear wall. The bayonet locking is designed such that, when locking is achieved by contact of said bayonet ring or rotation of same, the guide bushing is withdrawn to a specified extent from said gear wall. To said gear wall are attached elements, with similar action as groove pins pointing toward the electrical plate, which engage into corresponding centering and fastening sockets fitted on said electrical plate. When said bayonet ring is locked to said guide bushing, thus causing said guide bushing to be withdrawn or said electrical plate to be pulled toward said gear wall, said elements with similar action as groove pins are pressed into said centering and fastening sockets fitted to said elements. After said bayonet ring makes contact, the electrical plug-in connector and the electrical plate matching the connector part are then fastened to said gear wall.

To assure satisfactory long-term operation of such a gear, the electrical plate or electrical plug-in connector must be attached to the gear wall so that no play is allowed. If a play-free attachment is not provided, the elements can be damaged during motion against one another as the result of gear vibration. Even if such a play-free attachment of said electrical plate or electrical plug-in connector to said gear wall is achievable with the previously known plug-in connector, the reliability of the attachment with regard to gear vibration is strongly dependent on the quality of the frictional grip between the casing surface of the elements with similar action as groove pins and the cylindrical inner surfaces of the centering and fastening sockets. If a connection is produced that withstands strong extension forces, said connection requires a dimensional configuration of said elements with similar action as groove pins and said centering and fastening sockets such that the former must be pressed with strong force into the latter. As the number of fastening points used increases—three being customarily used—the force required to produce a connection also increases. Manual assembly is then not always possible. In addition, due to production tolerances in the attachment of said centering and fastening sockets and said elements with similar action as groove pins, said electrical plate can be subjected to undesired stress after contact is made with said gear wall.

SUMMARY OF THE INVENTION

Proceeding from the previously discussed prior art, the object of the present invention is thus to propose a generic electrical plug-in connector that not only can be assembled in a stress-free manner by simple means, but that also allows a play-free attachment to the wall.

This object is achieved by the invention in that the guide bushing is fitted with support elements that are supported on the wall surface on the socket side, and said guide bushing has a lock stop that is spaced at a distance from the support edge that is slightly larger than the distance between said support elements and the wall surface on the connector part side, on this same side of the opening area of the assembly hole, upon which lock stop, for an assembled plug-in connector, a bolt-action locking element exerts a fastening pressure directed away from the wall surface, said locking element being supported on its other side at the wall surface on the connector part side such that the wall sections bordering said assembly hole between said support elements of said guide bushing and said locking elements tightly brace said plug-in connector against the wall, said locking element for advancing to said lock stop being movably attached to said connector part.

Such an electrical plug-in connector is thus fastened to a wall so that, by means of the support element fitted to the guide bushing, an abutment supported on the wall surface on the socket side is formed, thus creating a force fit by insertion of the locking element such that said locking element is supported at the wall surface on the plug-in connector side, and also that pressure, directed toward said connector part, is exerted on said lock stop. This force fit fastens said guide bushing with no play in the assembly hole of said wall. In order to introduce such a locking element, an activating arm is suitably fitted thereto that is movably held against said connector part to perform the locking motion. Since said locking element is a component of said connector part, no additional aids are needed to assemble said electrical plug-in connector or to fasten the guide bushing of same in said assembly hole of said wall. Said guide bushing is locked and fastened in said assembly hole by simply leading said locking element to said lock stop of said guide bushing, whereby only that amount of force need be applied that is necessary to achieve the desired force fit. Since said locking element for fastening said guide bushing has a bolt-type action, said guide bushing is safeguarded against withdrawal by means of this bolt.

As a support element for the guide bushing, it is suitable to provide a support flange that is supported on the wall side, in the region of the opening of the assembly hole on the socket side. The lock stop is preferably the wall facing the wall of a surface locking groove that is introduced, tangentially arranged, into said guide bushing. To assure a consistent force fit of said guide bushing in said assembly hole, a preferred embodiment provides for two diametrically opposed locking grooves to be fitted to said guide bushing, whereby a forked locking clamp engages to lock the guide groove. Such a locking clamp, together with its locking arms, is pushed into said locking grooves with a pushing motion that is radially directed toward said guide bushing. To this end, a convex element, preferably a T-section, can be attached to the activating arm as a guide, whereby said convex element is slidably guided into a concave element attached to said connector part, which is suitably a C-section designed with complementary dimensions. Said activating arm is advantageously located with said locking clamp in the open position on said connector part before same is assembled, so that, after the guide bushing located on said connector part is introduced into said assembly hole by sliding said activating arm within the guide, locking can be achieved, such as by striking with a rubber hammer. Said guide bushing, together with optionally molded-on electrical plate, is then fastened with no play to a wall. After the socket part is introduced and locked to said guide bushing, the electrical plug-in connection is produced.

In the event that the guide bushing and the connector part are provided as two parts, said connector part has an insert edge at which said guide bushing can be introduced, internally adjacent thereto. Said insert edge preferably has two diametrically opposed locking slits that penetrate same, and said guide bushing is fitted with additional lock stops at appropriate positions. A connection between said guide bushing and said connector part can then likewise be made with a forked locking clamp. The assembly of such a plug-in connector is particularly simple if said locking clamp is arranged on the same activating arm, parallel to said locking clamp provided for locking of said guide bushing. With a single sliding motion of said activation arm, locking of said guide bushing with said connector part, as well as locking of said guide bushing in the assembly hole of the wall, occur simultaneously.

The pressure exerted by the locking arms on the lock stops can be created by curved sections of the locking clamp arms that are elastically resilient, at least in the vicinity of the curvature.

BRIEF DESCRIPTION OF THE DRAWINGS

Further advantages and developments of the invention are contained in the following description of a preferred embodiment. The following are shown.

DETAILED DESCRIPTION OF THE PREFERRED EMBODIMENT(S)

Figure 1:
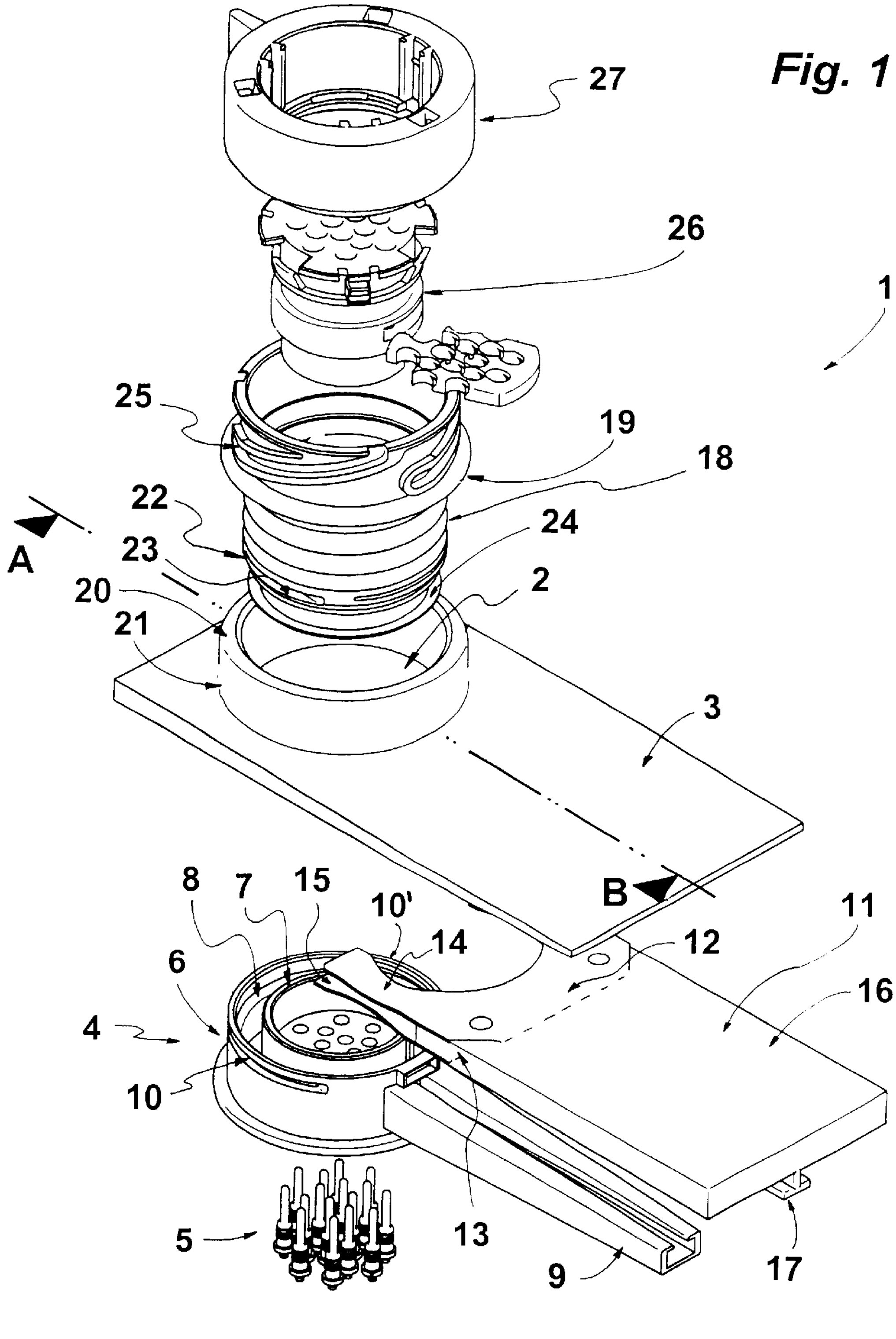
FIG. 1, an exploded representation of an electrical plug-in connector to be fastened in the assembly hole of a gear wall, FIG. 2, a cross section of the line A–B according to FIG. 1, with a guide bushing inserted into the assembly hole, FIG. 3, an arrangement according to FIG. 2, with the guide bushing inserted into the assembly hole and locked to the gear wall, and FIG. 4, a side view of the electrical plug-in connector with a socket part inserted therein.

FIG. 1 shows an electrical plug-in connector 1 to be fastened in an assembly hole 2 of a gear wall 3. Said electrical plug-in connector 1 comprises a socket part 4 into which plug contact pins 5 are inserted in a predetermined arrangement. Said socket part 4 has a circumferentially disposed insert edge 6 that, together with an inner bridge 7 adjoining said plug contact pin arrangement, forms an annular receptacle 8. A C-shaped guide track 9 is molded onto said insert edge 6 at a predetermined position, directed radially outward. Parallel to said guide track 9 arrangement and tangential to said insert edge 6, two diametrically opposed locking slits 10, 10' are introduced into said guide track and insert edge. Said locking slits 10, 10' are designed to penetrate said insert edge 6.

In addition, a locking element 11, designed as forked double clamps, is fitted to the connector part 4. Said locking element 11 comprises two individual forked locking clamps 12, 13, produced from spring steel, which are spaced apart from, and arranged atop, one another. The forked design of said locking clamps 12, 13 is formed respectively by two locking arms 14, 15, pointing toward said insert edge 6, of which only the locking arms 14, 15 on the left side are shown in FIG. 1. Said locking clamps 12, 13 are attached to an activating arm 16 which on its underside bears a T-shaped guide element 17 that is held and guided in the guide track 9. When said guide element 17 is inserted into said guide track 9, said activating arm 16, together with both of said locking clamps 12, 13, is radially slidable with respect to said insert edge 6, whereby said locking arms 15 of said locking clamp 13 engage in said locking slits 10, 10' of said insert edge 6 when said activating arm 16 is pushed toward said insert edge 6. The width of said locking arms 15 is specified such that said locking arms engage in the receptacle 8 when said locking element 11 is in its pushed-in position with respect to said insert edge 6.

On the side of the gear wall 3 opposite from the connector part 4 is located a guide bushing 18. Said guide bushing 18 is designed to be inserted into the assembly hole 2 of said gear wall 3. Said guide bushing has a support flange 19 that, after said guide bushing 18 is inserted into said assembly hole 2, is supported on the upper edge 20 of a reinforcement bead 21 that borders said assembly hole 2. In the plug-in direction, below said support flange 19, are introduced into said guide bushing two diametrically opposed locking grooves 22, of which only the left locking groove 22 is visible in FIG. 1. Said locking groove 22 is located at a distance from the underside of said support flange 19 that essentially corresponds to the length of said assembly hole 2, whereby the lower groove wall 23, as a lock stop after said guide bushing 18 has been introduced into said assembly hole 2, is arranged far enough below the underside of the wall such that both locking arms 14 of the locking clamp 12 can be pushed into the remaining intervening space. Said guide bushing 18 contains an additional lock stop 24 over which the locking arms 15 of the locking clamp 13 are fitted after assembly of the electrical plug-in connector 1. Above said support flange 19, said guide bushing 18 has bayonet guides 25 wherein, in order to create an electrical contact between the contact jacks held in a socket housing 26 and the plug contact pins 5 of the connector part 4, corresponding locking nibs of a bayonet ring 27 are engaged.

Figure 2:
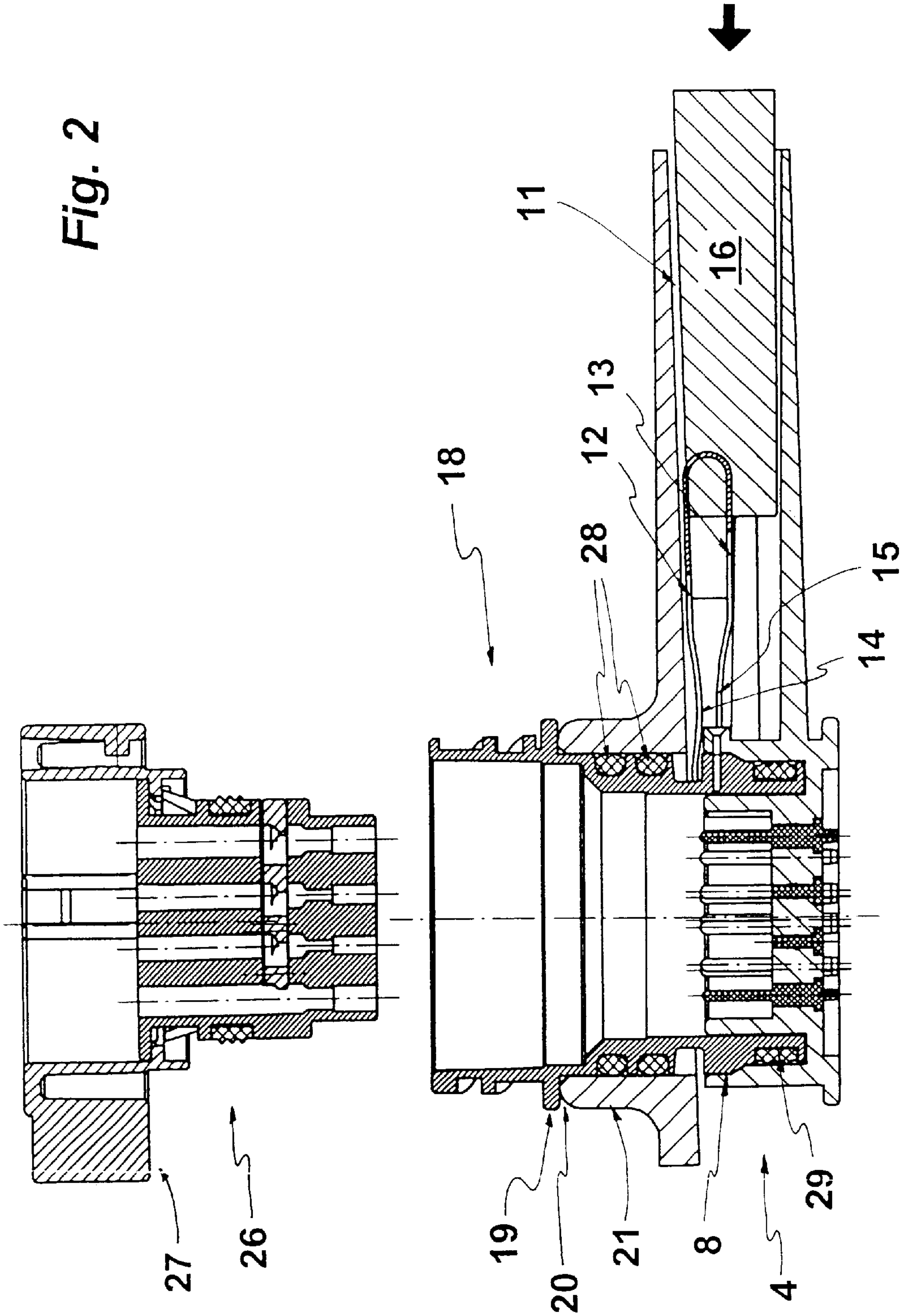
Figure 3:
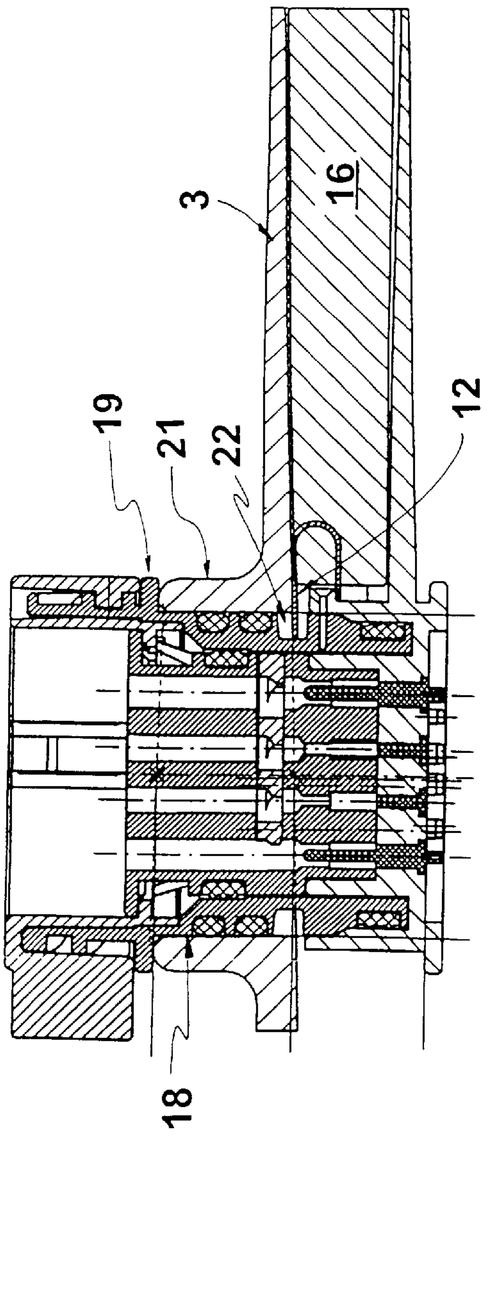

FIG. 2, in a cross section along the line A–B, shows the guide bushing 18 inserted into the assembly hole 2, said guide bushing being sealed with sealing rings 28 on the opposite side of the gear wall 3. It can be clearly seen that the support flange 19 is supported on the underside by the upper edge 20 of the reinforcement bead 21 bordering said assembly hole 2. The end section of said guide bushing 18 projecting from the underside of said assembly hole 2 is inserted into the receptacle 8 of the connector part 4, thus being held in a sealed position. This arrangement is achieved by pressing said connector part 4 onto the lower edge of said guide bushing 18, whereby, due to the sealing ring 29 provided for sealing, said arrangement is safeguarded against said connector part 4 sliding down. The locking element 11 is in its open position, so that the locking arms 14, 15 do not prevent said connector part 4 from making contact on said guide bushing 18. This figure also clearly shows the configuration of said locking arms 14, 15, which, in the region of their sections that are engaged in the locking slit 10 of said connector part 4 as well as in the locking grooves 22 of said guide bushing 18, have a curved design. This provides an arrangement wherein said locking arms 14, 15 curve toward one another, so that said locking element 11 has a concave contour in this region.

In order to effect locking of the guide bushing 18 in the assembly hole 2, and locking of said guide bushing 18 with the connector part 4, the locking element 11 is moved in the direction of the arrow. This causes the upper side of the locking clamp 12 to contact the inner surface of the gear wall 3. When said locking element 11 is pushed in, the locking arms 14 of said locking clamp 12 engage in the locking grooves 22 of said guide bushing 18, such that said guide bushing 18, by means of the spring-elastically reacting curved region of the locking arms of said locking element, is pulled along with the support flange 19 of said guide bushing being supported by the reinforcement bead 21, into the assembly hole 2. By the clamping of said reinforcement bead 21 between said support flange and said locking arms 14, said guide bushing 18 is thus fastened to said gear wall. At the same time that said locking arms 14 are pushed in, the locking arms 15 are pushed into the locking slit 10 of said connector part 4, thus forming an abutment that works in combination with the lock stop 24 of said guide bushing 18, such that said guide bushing 18 is safeguarded against being withdrawn from the receptacle 8. The likewise spring-elastically reacting curvature of said locking arms 15 achieves a play-free attachment when both components 4, 18 are locked.

Figure 4:
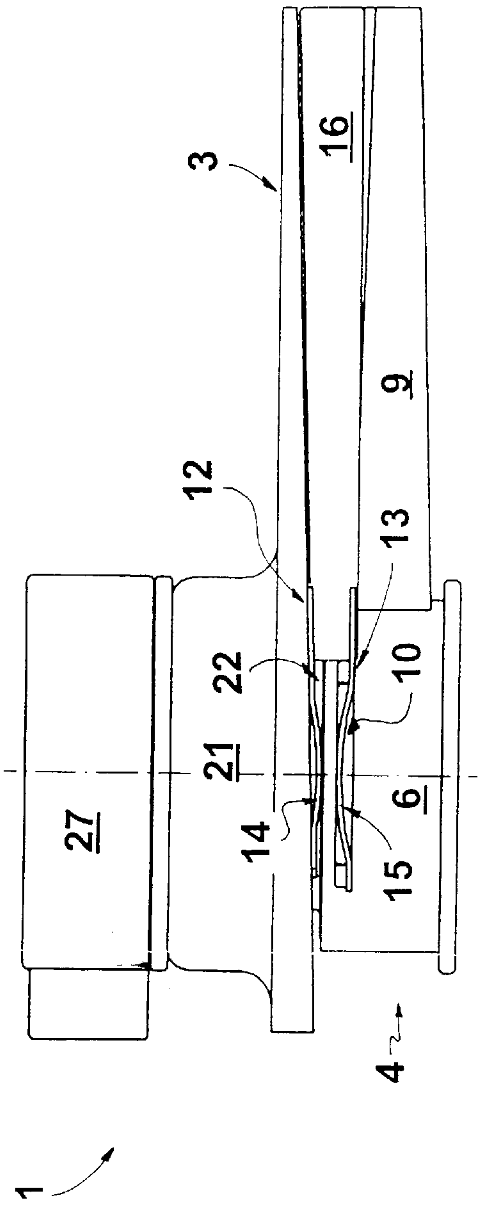

The completely assembled electrical plug-in connector 1 is again illustrated in FIG. 4 in a side view, showing in particular the engagement of the locking arms 14, 15 of the locking clamps 12, 13 into the locking slit 10 of the socket part 4 and into the locking groove 22 of the guide bushing 18.

It is particularly useful if the locking element 11 together with the locking clamps 12, 13, which is attached to the socket part 4, is interiorly positioned such that, for an opened housing, said locking clamps are pushed in a prelocked state, thus bringing the described support element 19 into its specified position and achieving the specified locking.

From the description of the invention, it is evident that the electrical plug-in connector 1 assures not only a secure attachment to a wall 3 with no play, but also can be easily manually assembled to or disassembled from said wall.

| List of reference numbers | |
|---|---|
| 1 | Electrical plug-in connector |
| 2 | Assembly hole |
| 3 | Gear wall |
| 4 | Connector part |
| 5 | Plug contact pin |
| 6 | Insert edge |
| 7 | Bridge |
| 8 | Receptacle |
| 9 | Guide track, C-shaped |
| 10, 10' | Locking slit |
| 11 | Locking element |
| 12 | Locking clamp |
| 13 | Locking clamp |
| 14 | Locking arm |
| 15 | Locking arm |
| 16 | Activating arm |
| 17 | Guide element, T-shaped |
| 18 | Guide bushing |
| 19 | Support flange |
| 20 | Upper edge |
| 21 | Reinforcement bead |
| 22 | Locking groove |
| 23 | Locking groove wall, lock stop |
| 24 | Lock stop |
| 25 | Bayonet guide |
| 26 | Socket housing |
| 27 | Bayonet ring |
| 28 | Sealing ring |
| 29 | Sealing ring |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An electrical plug-in connector for providing an electrical connection between two regions separated by a partition wall, the partition wall having an assembly hole with a reinforcement bead on a first side of the partition wall around the assembly hole, the electrical plug-in connector comprising:

a connector part positioned on a second side of the partition wall;

a guide bushing positioned on the first side of the partition wall, an extended portion of the guide bushing penetrating the assembly hole in the partition wall, the extended portion of the guide bushing having a support flange and a lock stop, the support flange being supported on the reinforcement bead of the assembly hole on the first side of the partition wall, the lock stop extending through the assembly hole to the second side of the partition wall and connected to the connector part; and a locking element connected to the connector part and operable to engage the lock stop and exert a fastening pressure directed away from the partition wall towards the connector part such that the extended portion of the guide bushing braces the guide bushing against the assembly hole.

2. The electrical plug-in connector of claim 1 wherein:

the locking element is movably connected radially to the connector part between a disengaged position in which the locking element is disengaged from the lock stop and an engaged position in which the locking element engages the lock stop.

3. The electrical plug-in connector of claim 1 wherein:

the connector part includes electrical plug-in contacts; and the electrical plug-in connector further includes a socket part having electrical contact jacks insertable into an opening of the guide bushing oppositely facing the connector part to create an electrical connection with the plug-in contacts of the connector part.

4. The electrical plug-in connector of claim 1 wherein:

the lock stop includes a locking groove.

5. The electrical plug-in connector of claim 4 wherein:

the locking groove includes a tangentially directed recess in the extended portion of the guide bushing.

6. The electrical plug-in connector of claim 1 wherein:

the lock stop includes two diametrically opposed locking grooves; and the locking element includes a forked locking clamp arranged at one end of an activating arm, wherein the forked locking clamp engages the two locking grooves to exert a fastening pressure directed away from the partition wall towards the connector part such that the extended portion of the guide bushing braces the guide bushing against the assembly hole.

7. The electrical plug-in connector of claim 6 wherein:

the activating arm includes a convex element; and the connector part includes a concave element, wherein the convex element slidably guides into the concave element to slidably guide the activating arm against the connector part in order to force the forked locking clamp to engage the two locking grooves.

8. The electrical plug-in connector of claim 7 wherein:

the convex element is a T-section and the concave element is a C-section.

9. An electrical plug-in connector for providing an electrical connection between two regions separated by a partition wall, the partition wall having an assembly hole with a reinforcement bead on a first side of the partition wall around the assembly hole, the electrical plug-in connector comprising:

a connector part positioned on a second side of the partition wall, the connector part having an insert edge provided with locking slits;

a guide bushing positioned on the first side of the partition wall, an extended portion of the guide bushing penetrating the assembly hole in the partition wall, the extended portion of the guide bushing having a support flange and a lock stop, the support flange being supported on the reinforcement bead of the assembly hole on the first side of the partition wall, the lock stop extending through the assembly hole to the second side of the partition wall and connected to the connector part within the insert edge in a region bordering the locking slits; and a locking element connected to the connector part, the locking element having a pair of locking arms which are resiliently biased towards one another, the first locking arm operable to engage the lock stop to exert a fastening pressure directed away from the partition wall towards the connector part such that the extended portion of the guide bushing braces the guide bushing against the assembly hole, and the second locking arm operable to engage the locking slits to exert a fastening pressure directed away from the connector part towards the guide bushing such that the connector part braces with the extended portion of the guide bushing.

10. The electrical plug-in connector of claim 9 wherein:

the locking element is movably attached radially to the connector part between a disengaged position in which the locking element is disengaged from the lock stop and the locking slits and an engaged position in which the locking element engages the lock stop and the locking slits.

11. The electrical plug-in connector of claim 10 wherein:

the locking element includes an activating arm which is slidable to radially move the locking element between the disengaged position and the engaged position.

12. The electrical plug-in connector of claim 9 wherein:

the connector part includes electrical plug-in contacts; and the electrical plug-in connector further includes a socket part having electrical contact jacks insertable into an opening of the guide bushing oppositely facing the connector part to create an electrical connection with the plug-in contacts of the connector part.

13. The electrical plug-in connector of claim 9 wherein:

the lock stop includes two diametrically opposed locking grooves tangentially directed recess in the extended portion of the guide bushing.

* * * * *